US011601471B2

(12) United States Patent
Mashargah et al.

(10) Patent No.: US 11,601,471 B2
(45) Date of Patent: Mar. 7, 2023

(54) INTEGRATED SERVICE MESH CONTROL PLANE MANAGEMENT

(71) Applicant: Cisco Technology, Inc., San Jose, CA (US)

(72) Inventors: Abdallah Mashargah, Santa Clara, CA (US); Eric Dale Williams, Champaign, IL (US); Prasad Chigurupati, Fremont, CA (US); Vinay Pande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 17/061,976

(22) Filed: Oct. 2, 2020

(65) Prior Publication Data

US 2022/0109693 A1   Apr. 7, 2022

(51) Int. Cl.

| H04L 9/40 | (2022.01) |
|---|---|
| H04L 41/0816 | (2022.01) |
| H04L 12/46 | (2006.01) |
| H04L 41/0869 | (2022.01) |
| H04L 45/586 | (2022.01) |

(52) U.S. Cl.
CPC ........ H04L 63/166 (2013.01); H04L 12/4633 (2013.01); H04L 41/0816 (2013.01); H04L 41/0869 (2013.01); H04L 45/586 (2013.01); H04L 63/20 (2013.01)

(58) Field of Classification Search
CPC ... H04L 63/166; H04L 63/20; H04L 12/4633; H04L 12/4641; H04L 41/0816; H04L 41/0869; H04L 45/586
See application file for complete search history.

(56) References Cited

U.S. PATENT DOCUMENTS

| 10,764,244 | B1 * | 9/2020 | Mestery | H04L 63/0272 |
|---|---|---|---|---|
| 11,171,842 | B2 * | 11/2021 | Palladino | H04L 43/0817 |
| 11,240,146 | B2 * | 2/2022 | Farnham | H04L 43/0852 |
| 2020/0162319 | A1 * | 5/2020 | Szigeti | H04L 41/084 |
| 2021/0112011 | A1 * | 4/2021 | K S | H04L 41/145 |
| 2021/0392477 | A1 * | 12/2021 | Taft | H04L 67/56 |

OTHER PUBLICATIONS

Li, Wubin, et al. "Service mesh: Challenges, state of the art, and future research opportunities." 2019 IEEE International Conference on Service-Oriented System Engineering (SOSE). IEEE. (Year: 2019).*

(Continued)

*Primary Examiner* — John M MacIlwinen
(74) *Attorney, Agent, or Firm* — Lee & Hayes, P.C.

(57) ABSTRACT

This disclosure describes an integrated management method to manage a service mesh data plane over a network fabric. The method includes determining at least one service mesh data plane policy for a microservice of a service mesh. The method further includes sending, over the network fabric, the at least one service mesh data plane policy to a virtual router associated with the microservice based at least in part on connectivity information maintained by a network fabric control plane manager of a configuration manager.

20 Claims, 9 Drawing Sheets

(56) References Cited

OTHER PUBLICATIONS

Malki, Amine El, and Uwe Zdun. "Guiding architectural decision making on service mesh based microservice architectures." European Conference on Software Architecture. Springer, Cham. (Year: 2019).*

Hussain, Fatima, et al. "Intelligent service mesh framework for api security and management." 2019 IEEE 10th Annual Information Technology, Electronics and Mobile Communication Conference (IEMCON). IEEE. (Year: 2019).*

Jouin, Lionel. "Network Service Mesh Solving Cloud Native IMS Networking Needs.". July (Year: 2020).*

Mora-Huiracocha, Ruben E., et al. "Implementation of a SD-WAN for the interconnection of two software defined data centers." 2019 IEEE Colombian Conference on Communications and Computing (COLCOM). IEEE. (Year: 2019).*

Troia, Sebastian, et al. "SD-WAN: an open-source implementation for enterprise networking services." 2020 22nd International Conference on Transparent Optical Networks (ICTON). IEEE, Jul. 19-23. (Year: 2020).*

Morgan, William. "What is a service mesh? And why do I need one? | Linkerd". https://linkerd.io/2017/04/25/whats-a-service-mesh-and-why-do-i-need-one/. (Year: 2017).*

* cited by examiner

INTEGRATED SERVICE MESH CONTROL PLANE MANAGEMENT

TECHNICAL FIELD

The present disclosure relates generally to techniques for centrally managing a service mesh by configuring a control plane for service mesh functionality of a software defined wide area network.

BACKGROUND

A cloud-native application is a collection of small, independent, and loosely coupled services. In contrast to employing a monolithic architecture, many cloud-native applications employ a microservice architecture.

In a monolithic architecture, an application is typically built as a single deployable unit. By contrast, in a microservice architecture, a complex system may be split into multiple independent, narrowly focused services, each with its own isolated business logic and data store. In a microservice architecture, typically, any service can be scaled and deployed separately.

A service mesh may be utilized to control how the microservices and other parts of an application share data with one another. A service mesh is a dedicated configurable infrastructure layer built right into an application, typically designed to handle a high volume of network-based interprocess communication using application programming interfaces (APIs). The service mesh may provide capabilities such as service discovery, load balancing and encryption.

A challenge with microservice architectures is manage the communication between the cloud-native microservice components, including cloud-native microservice components that are hosted in different physical locations and communicate with each other across a network, such as over a Software-Defined Wide Area Network (SD-WAN).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a diagram illustrating a use case for an IoT cloud-native application deployed at the edge. FIG. 6 is a diagram illustrating an architecture in which the IoT cloud-native application may be centrally managed.

DESCRIPTION OF EXAMPLE EMBODIMENTS

Overview

Figure 1:
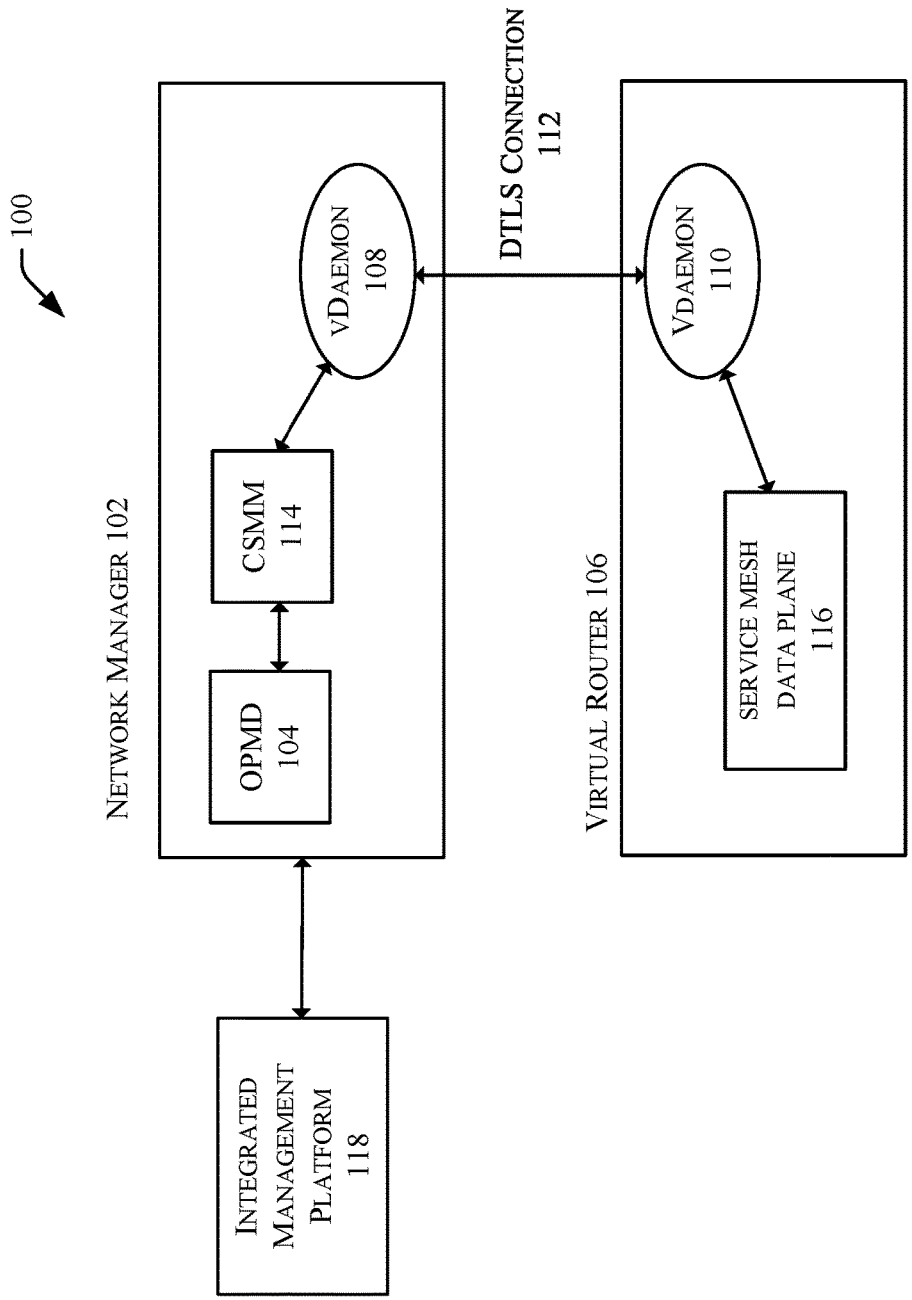
FIG. 1 is a diagram illustrating an architecture of an example system that organically integrates cloud-native application management with network management.

This disclosure describes an integrated management method to manage a service mesh data plane over a network fabric. The method includes determining at least one service mesh data plane policy for a microservice of a service mesh. The method further includes sending, over the network fabric, the at least one service mesh data plane policy to a virtual router associated with the microservice based at least in part on connectivity information maintained by a network fabric control plane manager of a configuration manager.

This disclosure further describes a method of configuring a microservice of a cloud-native application. The method includes, by a data plane of the microservice, receiving at least one service mesh data plane policy from a virtual router associated with the microservice. The method further includes configuring the microservice data plane based at least in part on the at least one service mesh data plane policy.

Additionally, the techniques described herein may be performed by a system and/or device having non-transitory computer-readable media storing computer-executable instructions that, when executed by one or more processors, performs the methods described herein.

EXAMPLE EMBODIMENTS

Cloud-native applications, comprising multiple "microservice" applications supported by a service mesh, are becoming more widely used. Instances of the microservice applications may be hosted at different locations, and the microservice applications instances may communicate with each other over an SD-WAN.

The service mesh may be implemented by providing a proxy instance, called a sidecar, for each microservice application instance. Sidecars may manage interservice communication over the SD-WAN, monitoring, and security related concerns and/or other functions that may be abstracted away from the individual microservice application instances.

The SD-WAN may operate as a virtualized network that runs as an overlay on hardware, whether physical routers, called edge routers, or virtual machines in the cloud, called virtual routers. A centralized network management application may be provided for network administrators to oversee the control plane of the SD-WAN fabric. For example, the centralized network management application may be a centralized network management application that users may utilize to oversee the control plane of an SD-WAN fabric, efficiently managing the provisioning, maintenance, and security for an entire overlay network.

On the other hand, microservice application instances of cloud native applications, in a service mesh environment, are many times are individually managed, via a local interface. For example, a branch facility, such as a store of a multi-store coffee chain, may be expected to manage its own instances of microservice applications, such as to troubleshoot issues, perform upgrades, and other microservice management functions. Employees of the branch facility may not perform microservice management functions properly. For example, the employees may not have sufficient technical expertise or time to perform the management tasks. In many situations, the branch facility may have to employ or contract to IT staff to perform the microservice management functions.

It may be advantageous to organically integrate cloud-native application management with network management. For example, the microservice application instances may communicate over an SD-WAN, and a centralized network management application may be provided to configure the SD-WAN. By integrating the management of cloud-native applications with network management, organizations may have improved ability to establish and manage service mesh functionality on top of an existing SD-WAN fabric. The integrated management may provide for simplified communication across the SD-WAN between cloud-native microservices hosted at different locations.

For example, cloud-native applications may be used by companies or other organizations that are implementing DevSecOps (short for development, security and operations) into their business operations. DevSecOps is a philosophy of integrating security practices within a process of software development and application management. With centralized management of the service mesh data plane, the software development and application management may be more controlled and secure than if the applications are managed at individual locations.

For example, a control plane for the service mesh may be provided, to control the service mesh data plane. A network controller may, for example, have intelligence to control/configure routing policies over an SDWAN while also handing service mesh policies defined using a service mesh management platform, such as using dynamic application programming interfaces (APIs). For example, the network controller may include a cloud services mesh management module (CSMM) along with an overlay management protocol director (OMPD). The CSMM may send and receive messages to or from a virtual router CSMM module. For example, an OMPD DTLS tunnel is used as transport to exchange CSMM messages. For example, an additional address family (AF) may be provided for the OMP.

OMP may reflect service connectivity information to the virtual router service mesh data plane, and this connectivity can provide a reliable and secure tunnel to carry CSMM messages from the CSMM to the virtual router service mesh data plane. Similarly, the connectivity can be utilized to carry CSMM messages from the virtual router service mesh data plane to the network controller. The CSMM messages may include, for example, information of services discovery and services connectivity based on transport location (TLOC) details.

In addition, an integrated management platform may be provided, including the service mesh management platform, via which an administrator, for example, may interact with the network controller to define policies for operation of the SD-WAN as well as policies for controlling the service mesh data plane.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an architecture of an example system 100 that organically integrates cloud-native application management with network management. A network manager 102 is provided for administering the control plane of the SD-WAN fabric, efficiently managing provisioning, maintenance, and security for the entire SD-WAN network. For example, the network manager 102 may maintain a centralized route table that stores the route information, called OMP routes, that it learns from the edge routers and from any other network managers in the SD-WAN overlay network. Based on the configured policy, the network manager 102 may share this route information with edge network devices in the network so that they can communicate with each other.

The network manager 102 includes an overlay management protocol director (OMPD) 104. Overlay management protocol (OMP) is a control protocol that may be used to exchange routing policy and management information between the network manager 102 and a virtual router 106 in an overlay network. For example, the overlay network may be an SD-WAN fabric that forms a software overlay running over standard network transport services, including the public Internet, multiprotocol label switching (MPLS), and broadband. The virtual router 106 is a software function that replicates in software the functionality of hardware-based Layer 3 Internet Protocol (IP) routing, which has traditionally used a dedicated hardware device. Virtual routing is a form of network functions virtualization, in which the functions of traditional hardware-based network appliances are converted to software that can be run on standard commercial off-the-shelf hardware.

OMP, operating in an overlay networking environment, employs a notion of routing peers that may be different from a traditional network environment. From a logical point of view, the overlay environment may include a centralized controller, such as the network manager 102) and a number of edge devices, such as the virtual router 106. Each virtual router 106 may advertise routes to the network manager 102, and based on policy decisions, the network manager 102 may distribute the overlay routing information to other virtual routers 106 in the network. For example, the routing information may include transport location mappings, or TLOCs. Virtual routers 106 typically do not advertise routing information to each other, either using OMP or any other method. The OMP peering sessions between the network manager 102 and the virtual routers 106 are used to exchange control plane traffic; but are not utilized for data traffic.

For example, OMP may perform path selection, loop avoidance, and policy implementation on each local device to decide which routes are installed in the local routing table of any edge device. OMP may advertise the following types of routes:

OMP routes—Prefixes that establish reachability between end points that use the OMP-orchestrated transport network. For example, OMP routes can represent services in a central data center, services at a branch office, or collections of hosts and other end points in any location of an overlay SD-WAN network. OMP routes may resolve into TLOCs for functional forwarding.

Transport locations (TLOCs)—Identifiers that tie an OMP route to a physical location. The TLOC is the only entity of the OMP routing domain that is visible to the underlying network, and it must be reachable via routing in the underlying network. A TLOC can be directly reachable via an entry in the routing table of the physical network, or it must be represented by a prefix residing on the outside of a NAT device and must be included in the routing table. In comparison with BGP, the TLOC acts as the next hop for OMP routes.

Service routes—Identifiers that tie an OMP route to a service in the network, specifying the location of the service in the network. Services include, for example, firewalls, intrusion detection systems, and load balancers. Service route information may be carried in both service and OMP routes.

OMP may also advertise routing policies configured on the network manager 102 to be executed on the virtual router 106. These routing policies may include, for example, application-routing policies, templates for traffic sampling, and data policy.

The network manager 102 and the virtual router 106 each include a virtual daemon 108 and 110, respectively. The virtual daemon 108 and virtual daemon 110 create and maintain a secure Datagram Transport Layer Security (DTLS) connection 112 between the network manager 102 and the virtual router 106, for each virtual router 106 in the SD-WAN. DTLS is a secure communications protocol for communication of datagrams between applications.

The network manager 102 additionally includes a CSMM module 114. The CSMM module 114 is configured to send and receive messages to or from, respectively, a service mesh data plane 116 of the virtual router 106. The CSMM 114 and the service mesh data plane 116 utilize the DTLS connection 112, also utilized by the OMPD 104, as a transport to exchange CSMM messages. The CSMM messages may include, for example, information of services discovery and services connectivity based on TLOC details. The OMP may utilize an additional Address Family (AF) for communication of the CSMM messages, to provide basic services to a protocol, within the DTLS connection 112, for the communication of the CSM messages.

The network manager 102 may implement dynamic APIs for dynamic service mesh configuration, for use with an integrated management platform 118, which may be management platform that offers an intelligent level of management to enable IT organizations to analyze, simplify, and automate their environments in advanced ways. The integrated management platform 118 may be provided, for examples, as a Software as a Service (SaaS). The integrated management platform 118 may provide an integrated and intuitive management experience for resources in the traditional data center and at the edge, including for management of the SD-WAN. Based at least in part on a configuration defined by the integrated management platform 118, the CSMM 114 may pass the defined configuration to the service mesh data plane 116.

The service mesh data plane 116 may be static, dynamic or a combination of both, depending on a scenario that the control plane defines. The OMPD DTLS tunnel 112 can be used to provide messages from the network manager 102 to implement the dynamic configuration, such as a dynamic configuration file that holds a new configuration or an updated configuration for each service.

The dynamic nature of a configuration can add an extra value to environments employing a microservices architecture, such as providing flexibility to DevSecOps teams to push new configurations to a proxy (sidecar) without affecting connected services, and this can be done on scale to "n" data plane proxies.

Data plane runtime models, as an example, may include the following services/objects:

Forwarder service: services to which traffic can be routed in a target cluster

Monitor service: service to publish ports on which to listen for traffic

Routes service: service for traffic routing decisions

Gatekeeper service: service for certificates distribution to application microservices Health check service: service for end-point health monitoring Load balancing service: service to organize application accessibility based on the load balancing algorithms.

Figure 2:
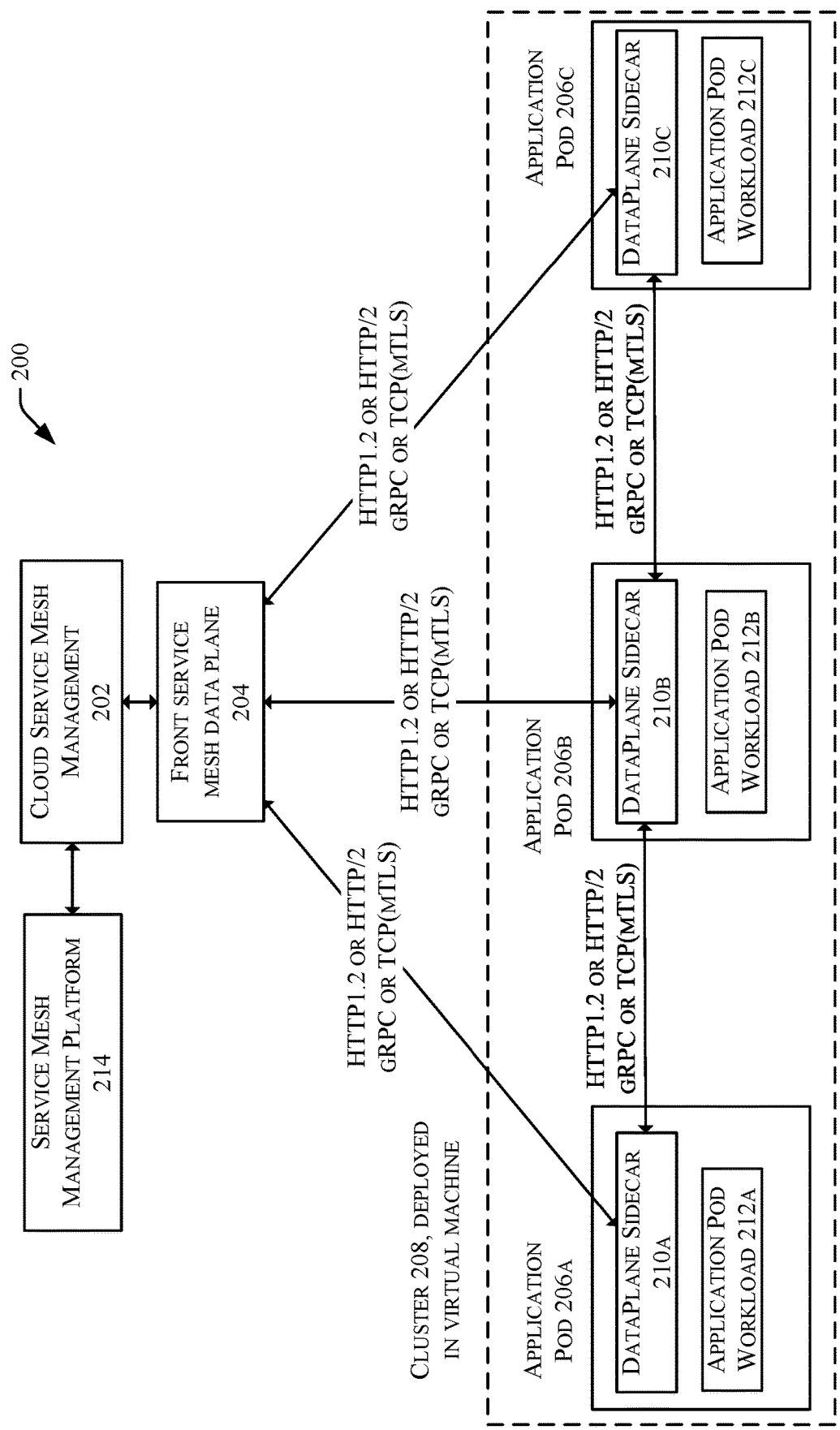
FIG. 2 is a diagram illustrating, at a high level, an architecture of an example system to configure a service mesh.

FIG. 2 is a diagram illustrating, at a high level, an architecture of an example system 200 to configure a service mesh. The system 200 may be a slice of the example integrated system 100—the slice to centrally configure and manage a service mesh. Referring to FIG. 2, the CSMM 202 is configured to send and receive messages to or from, respectively, a front service mesh data plane 204 of a virtual router. The CSMM 202 and the service mesh data plane 204 may, for example, utilize a DTLS connection 112, that is also utilized by an SD-WAN overlay management protocol director, as a transport to exchange CSMM messages. While not shown in FIG. 2, the service mesh data plane 204 may be one of many service mesh data planes in a SD-WAN. For example, other service mesh data planes may be within other virtual routers of an SD-WAN.

The front service mesh data plane 204 may communicate with application pod 206a, application pod 206b and application pod 206c within a cluster 208 deployed in a virtual machine. For example, application pod 206a may include a dataplane sidecar 210a and an application pod workload 212a that may be comprised of microservices on the service mesh. Similarly, application pod 206b may include a dataplane sidecar 210b and an application pod workload 212b that may be comprised of microservices on the service mesh. And application pod 206c may include a dataplane sidecar 210c and an application pod workload 212c that may be comprised of microservices on the service mesh.

A sidecar is an application design abstraction, which abstracts features such as interservice communications, monitoring and security, away from a main architecture of an application. Sidecars are typically used within the service mesh control plane, to manage and configure each sidecar in relation to its associated service. Network traffic from the associated service is filtered through the sidecar. The abstraction of the sidecar may ease changing certain features, handled by the sidecar, without changing the rest of the application. Furthermore, if an organization is using kubernetes (an open-source container-orchestration system) or a similar system to monitor containerized applications, the containers can be grouped together in a pod that shares a common namespace. A separate sidecar container can be used to visualize how each container in the same pod is operating. For example, each of application pod 206a, application pod 206b and application pod 206c has associated dataplane sidecar 210a, dataplane sidecar 210b and dataplane sidecar 210c, respectively. The application pod 206a, application pod 206b and application pod 206c have application pod workload 212a, application pod workload 212b and application pod workload 212c, being respectively monitored by dataplane sidecar 210a, dataplane sidecar 210b and dataplane sidecar 210c. The front service mesh data plane 204 may operate as a proxy for the dataplane sidecar 210a, the dataplane sidecar 210b and the dataplane sidecar 210c with respect to communications with the CSMM 202.

In the system 200, the front service mesh data plane 204 communicates with each of the dataplane sidecar 210a, the dataplane sidecar 210b and the dataplane sidecar 210c using the HTTP1.2 or HTTP/2 protocol at the application layer, over a respective gRPC or TCP (mTLS) transport layer connection. gRPC is an open source high performance remote procedure call framework that can run in many environments. The gRPC framework efficiently connects services in and across data centers, and the framework includes pluggable support for various functions such as load balancing, tracing, health checking and authentication. With gRPC, a client application can directly call a method on a server application on a different machine as if the method were a local object. This eases the process of developing and implementing distributed applications and services such as cloud-native applications that employ a microservice architecture. gRPC allows for defining a service, specifying the methods that can be called remotely (including parameters and return types). On the server side, the server implements an interface and runs a gRPC server to handle client calls. On the client side, the client includes a stub that provides the same methods as those provided by the server.

Similarly, communication between the dataplane sidecar 210a, the dataplane sidecar 210b and the dataplane sidecar 210c is using the HTTP1.2 or HTTP/2 protocol at the application layer, over a respective gRPC or TCP (mTLS) transport layer connection.

Referring still to FIG. 2, the system 200 also includes a service mesh management platform 214. The service mesh management platform 214 provides an intelligent level of management to enable IT organizations to interface with the service mesh control plane. The service mesh management platform 214 may be provided, for example, as a Software as a Service (SaaS). Based at least in part on a configuration defined by the service mesh management platform 214, the CSMM 202 may pass the defined configuration to the service mesh data plane 204.

Figure 3:
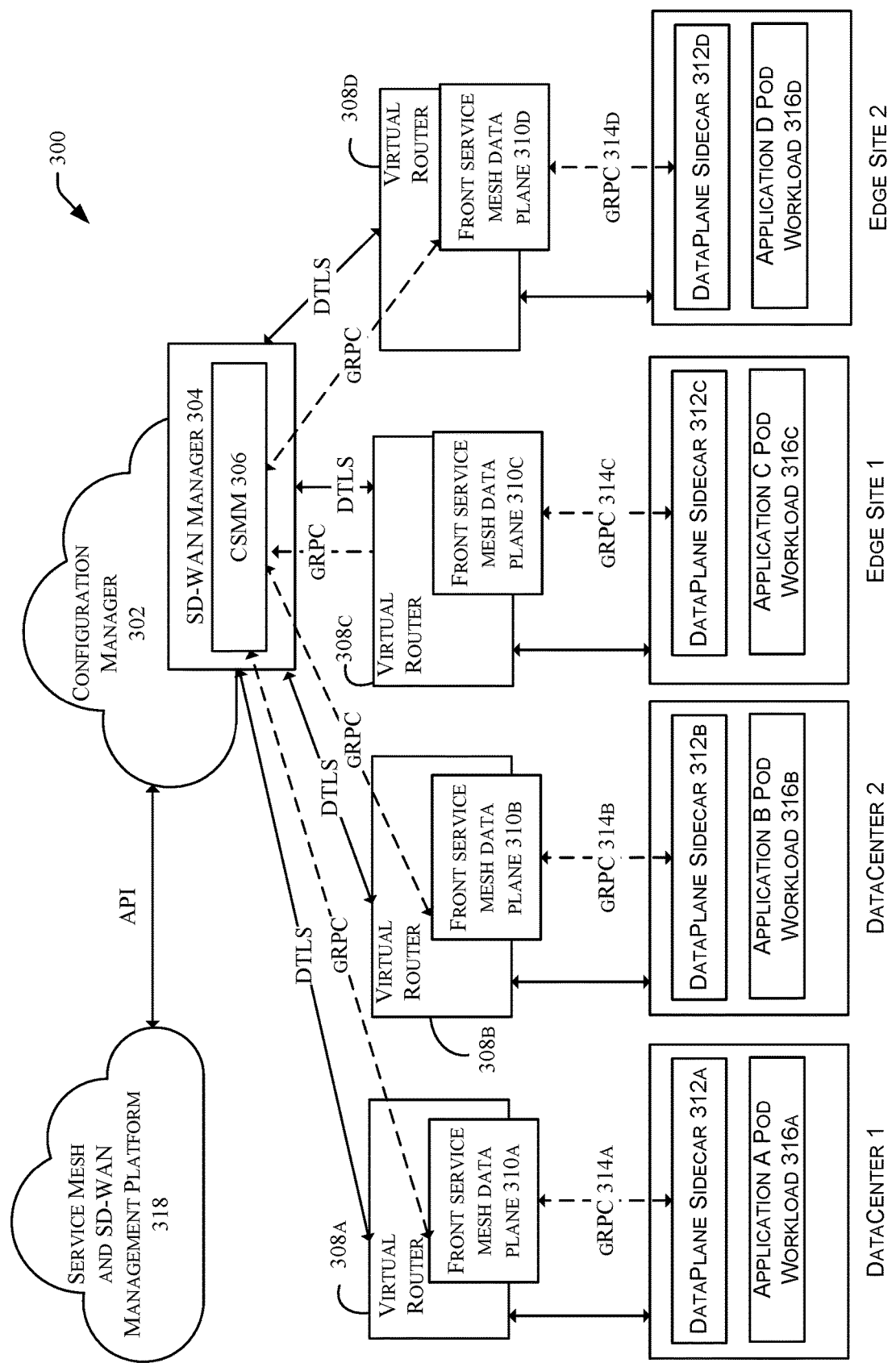
FIG. 3 illustrates an example integrated system that provides for integrated central management of cloud-native microservices as well as management of an SD-WAN that provides, in part, for communication among the microservices.

FIG. 3 illustrates an example integrated system 300 that provides for integrated central management of cloud-native microservices as well as management of an SD-WAN that provides, in part, for communication among the microservices. For example, the microservices may be deployed using a container-as-a-service platform that simplifies provisioning and ongoing operations for Kubernetes across cloud, data center, and edge. For example, the microservices may be in a virtualized and containerized deployment with multiple hypervisors The platform may include tools for application performance monitoring, application placement, and cloud mobility.

The integrated central management may provide for simplified communication across the SD-WAN between the cloud-native microservices, which may be hosted at different locations. The integrated central management may provide the ability to control and retrieve the clusters related inventory to create compute and network polices, and then apply the compute and network policies back to the cluster control plane. In addition, the integrated central management may support the SD-WAN in an edge deployment configuration, such as to retrieve related data that can be used as an input to the service mesh policies. Such data may include, for example, information about virtual private networks (VPNs), identity of datacenters and branches, and routing protocols.

Thus, for example, an integrated central management platform may be provided to allow for mesh connector policies configuration and SD-WAN cloud services mesh management policies configuration. The integrated management platform may access APIs exposed by a centralized management function that implements the policies.

For example, the following policies may be implemented:
Service discovery policy: This policy is responsible for retrieving the cluster services discovered by CSMM and identify them as a target for other implementation by other policies.
Service reachability policy: This policy guarantees connectivity between solution components.
Mesh connector policy: This policy is responsible for definition and implementation of dynamic APIs.
Site identity policy: This policy defines where a configuration is to be implemented, including routing based on identity and creating an administrative domain segmentation concept. The routing policies to be implemented may be defined, for example, to allow service to service communication between multiple clusters (such as located in datacenter sites or edge sites).

The FIG. 3 system 300 provides an in-depth end to end communication path between the architecture components and illustrates advantages of a dynamic API implementation such as has been described above. In addition, the system 300 provides an integrated policy management platform and an integrated policy manager, via which functionality is provided, for example, to manage and update service mesh control plane routing, application service discovery and related configuration for multiple data planes connected to the architecture.

Referring to FIG. 3, a configuration manager 302 includes an integrated SD-WAN manger 304 and a CSMM 306. The configuration manager 302 communicates with virtual router 308a, with virtual router 308b, with virtual router 308c and with virtual router 308d. The virtual router 308a is located at a DataCenter 1. The virtual router 308b is located at a DataCenter 2. The virtual router 308c is located at an Edge Site 1. The virtual router 308d is located at an Edge Site 2. The configuration manager 302 communicates with each of the virtual router 308a, the virtual router 308b, the virtual router 308c and the virtual router 308d via a respective DTLS connection.

The virtual router 308a includes a front service mesh data plane 310a. The virtual router 308b includes a front service mesh data plane 310b. The virtual router 308c includes a front service mesh data plane 310c. The virtual router 308d includes a front service mesh data plane 310d. The CSMM 306 communicates with each of the front service mesh data plane 310a, the front service mesh data plane 310b, the front service mesh data plane 310c and the front service mesh data plane 310d via a respective gRPC stream. Each respective gRPC stream is provided over a DTLS connection between the configuration manager 306 and the respective one of the virtual router 308a, the virtual router 308b, the virtual router 308c and the virtual router 308d. More specifically, the ultimate endpoint of the respective gRPC stream is the front service mesh data plane 310a, the front service mesh data plane 310b, the front service mesh data plane 310c and the front service mesh data plane 310d.

Each of the front service mesh data plane 310a, the front service mesh data plane 310b, the front service mesh data plane 310c and the front service mesh data plane 310d may be static, dynamic or a combination of both, depending on a scenario that the control plane defines. The dynamic nature of a configuration can add an extra value to environments employing a microservices architecture, and this can be done on scale to "n" data plane proxies.

The virtual router 308a, the virtual router 308b, the virtual router 308c and the virtual router 308d are a logical endpoint of the SD-WAN. The front service mesh data plane 310a, the front service mesh data plane 310c and the front service mesh data plane 310d operate to extend communication to the service mesh application operating at the DataCenter 1, the DataCenter 2, the EdgeSite1 and the EdgeSite2. More specifically, the front service mesh data plane 310a, the front service mesh data plane 310c and the front service mesh data plane 310d operate to extend communication to the service mesh application via the DataPlane Sidecar 312a, the DataPlane Sidecar 312b, the DataPlane Sidecar 312c and the DataPlane Sidecar 312d, respectively. The communication between the front service mesh data plane 310a, the front service mesh data plane 310c and the front service mesh data plane 310d o to the service mesh application via the DataPlane Sidecar 312a, the DataPlane Sidecar 312b, the DataPlane Sidecar 312c and the DataPlane Sidecar 312d, may be via a respective gRPC connection 314a, 314b, 314c or 314d.

Based at least in part on the service mesh configuration defined at a service mesh and SD-WAN management platform 318, accessing the configuration manager 302 using APIs, the CSMM 306 appropriately distributes service mesh configuration commands over the SD-WAN and destined to the dataplane sidecar 312a, to the dataplane sidecar 312b, to the dataplane sidecar 312c and to the dataplane sidecar 312d. This provides for centralized functionality to manage and update service mesh control plane routing and application service discovery and the related configuration for the multiple data planes of the service mesh.

Figure 4:
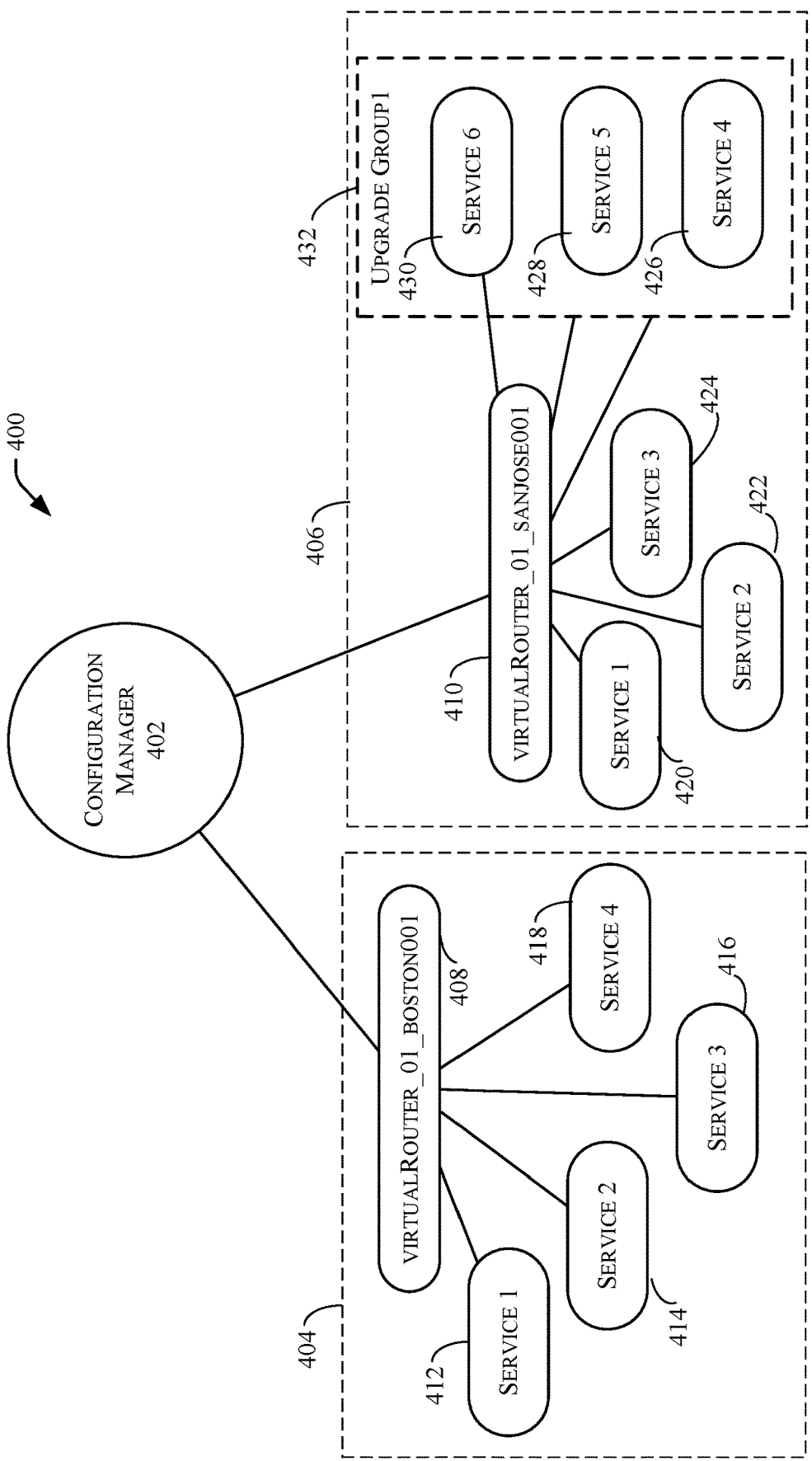
FIG. 4 illustrates an example system and shows how a configuration manager may be configured to selectively upgrade and/or update a group of microservices at a specific site.

FIG. 4 illustrates an example system 400 and shows how a configuration manager 402 may be configured to selectively upgrade and/or update a group of microservices at a specific site. For example, as part of a Continuous Integration/Continues Delivery (CI/CD) strategy, a user may particular microservices to be upgraded and/or updated based on a "canary" deployment strategy, where a change (i.e., in the FIG. 4 example system, an upgrade and/or update to one or more microservices) is partially deployed in a specific site, such as based on the latest version available for each microservice in a container images hub. The upgrade and/or update may be tested at the specific site before being widely deployed.

The system 400 includes two sites, site 404 and site 406. This is a simplistic example, and many systems have more than two sites. Site 404 is served by a virtual router 408 identified as virtualRouter_01_boston001. Site 406 is served by a virtual router 410, identified as virtualRouter_01_sanjose001.

The site 404 includes an instance 412 of service 1, an instance 414 of service 2, an instance 416 of service 3, and an instance 418 of service 4. The site 406 includes an instance 420 of service 1, an instance 422 of service 2, and an instance 424 of service 3. The site 406 also includes an instance 426 of service 4, an instance 428 of service 5 and an instance 430 of service 6.

Furthermore, an upgrade group 432 includes the instance 426 of service 4, the instance 428 of service 5 and the instance 430 of service 6. The upgrade group is defined, for example, by the configuration manager 402 as including instances to upgrade and/or update. Thus, for example, the configuration manager 402 may manage an upgrade and/or update to the service of the upgrade group 432—including the instance 426 of service 4, the instance 428 of service 5 and the instance 430 of service 6—and then exercise the instance 426 of service 4, the instance 428 of service 5 and the instance 430 of service 6.

In practice, a user may interact with a management platform, like the service mesh and SD-WAN management platform 318, to view a user interface that looks similar to the illustration in FIG. 4. The user may interact with the management platform to designate the upgrade group 432, thereby configuring the configuration manager 402 to initiate the upgrade and/or update.

Figure 5:
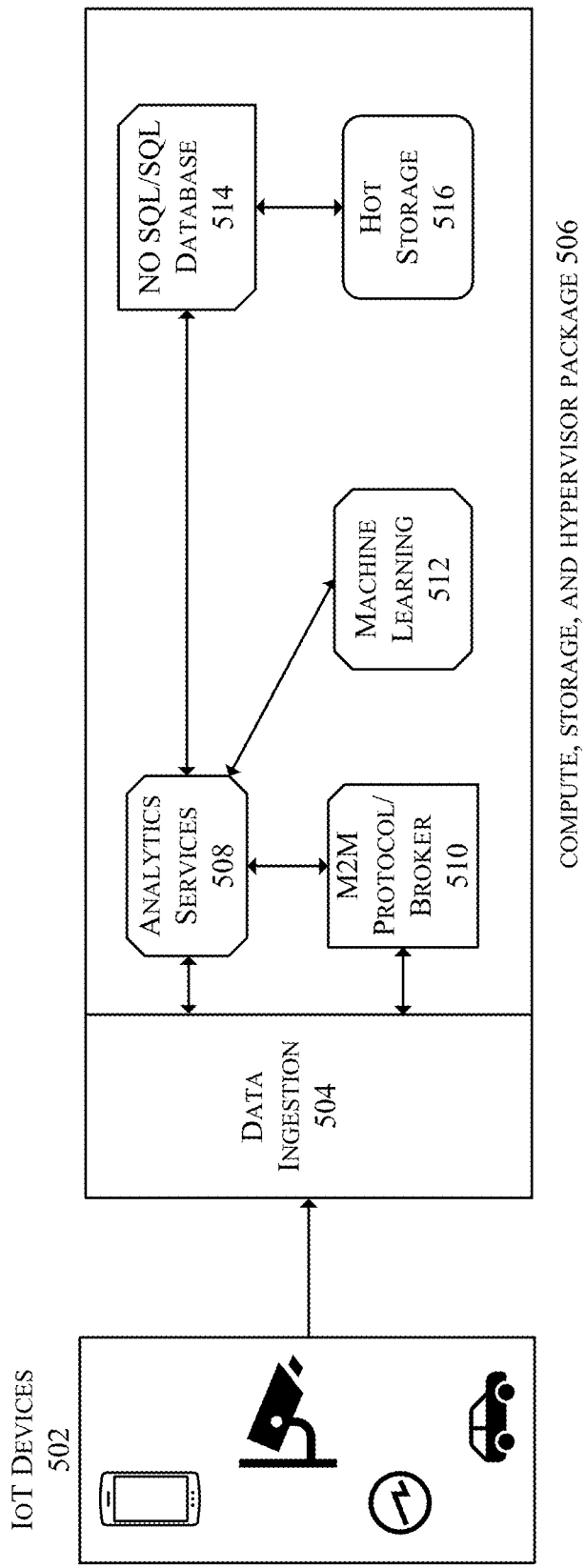
FIG. 5 and FIG. 6 illustrate how a centralized functionality may be utilized to manage and update service mesh control plane routing and application service discovery and the related configuration for the multiple data planes of the service mesh for a cloud-native Internet of Things (IoT) application.
Figure 6:
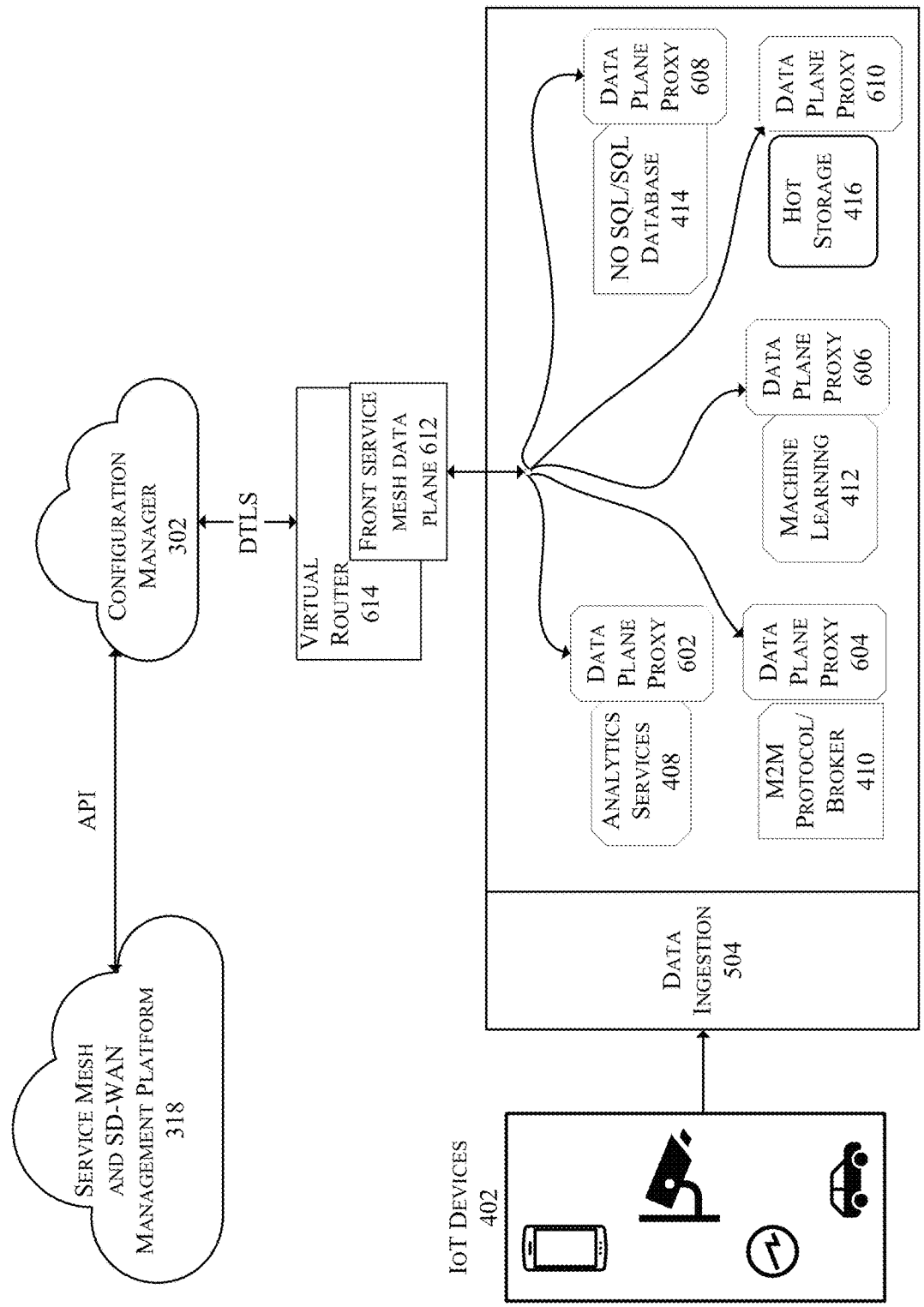

FIG. 5 and FIG. 6 illustrate how a centralized functionality may be utilized to manage and update service mesh control plane routing and application service discovery and the related configuration for the multiple data planes of the service mesh for a cloud-native Internet of Things (IoT) application. FIG. 5 is a diagram illustrating a use case for an IoT cloud-native application deployed at the edge. Referring to FIG. 5, IoT devices 502 provide data, such as sensor data, to data ingestion functionality 504 of a compute, storage and hypervisor package 506 deployed at the edge. The compute, storage and hypervisor package 506 includes various services, including analytics services 508, an M2M protocol/broker service 510, machine learning service 512, a NO SQL/SQL database service 516 and a hot storage service 518.

Referring still to FIG. 5, an administrator may desire or need to deploy a new version of any of the analytics service 508, the M2M protocol/broker service 510, the machine learning service 512, the NO SQL/SQL database service 514 or the hot storage service 516 in the compute, storage, and hypervisor package 506. In such a situation, the administrator would manually access the compute, storage, and hypervisor package 506 and app and run the update or the change. As another example, the administrator may desire or need to deploy a security or traffic update or change for any of the analytics service 508, the M2M protocol/broker service 510, the machine learning service 512, the NO SQL/SQL database service 514 or the hot storage service 516 in the compute, storage, and hypervisor package 506. Similarly, the administrator would manually access the compute, storage, and hypervisor package 506 and app and run the update or the change. In any case, the update or change may depend on the underlay and/or the overlay technology installed on the site running the compute, storage and hypervisor package 506.

FIG. 6 illustrates an architecture in which a cloud-native application may be centrally managed. Referring to FIG. 6, the M2M protocol/broker service 410, the machine learning service 412, the NO SQL/SQL database service 414 or the hot storage service 416 in the compute, storage, and hypervisor package 406 are each paired with a data plane proxy 602, a data plane proxy 604, a data plane proxy 606, a data plane proxy 608 and a data plane proxy 610, respectively. The components of the compute, storage, and hypervisor package 406 are configured to communicate with a front service mesh data plane 612 of a virtual router 614, via the data plane proxy 602, the data plane proxy 604, the data plane proxy 606, the data plane proxy 608 and the data plane proxy 610, which manage interservice communication over the SD-WAN fabric.

More specifically, the front service mesh data plane 612 of the virtual router is in communication with the configuration manager 302. The configuration manager 302 may include, for example, the CSMM 306 to appropriately distribute service mesh configuration commands over the SD-WAN and destined to the data plane proxy 602, the data plane proxy 604, the data plane proxy 606, the data plane proxy 608 and the data plane proxy 610. In particular, the service mesh configuration commands that CSMM 306 distributes to the data plane proxy 602, the data plane proxy 604, the data plane proxy 606, the data plane proxy 608 and the data plane proxy 610 may be generated by the CSMM 306 based at least in part on the service mesh and SD-WAN management platform 318, accessing the configuration manager 302 using APIs. As a result, the cloud-native application such as the compute, storage, and hypervisor package 406 may be centrally managed by, for example, an administrator accessing the service mesh and SD-WAN management platform 318.

Thus, for example, the administrator may configure which instances (or all instances) of the compute, storage, and hypervisor package 406 are to be updated, changed, etc. With the FIG. 6 architecture, the administrator may have flexibility to perform an upgrade using a defined policy and push the resulting configuration automatically to the respective edge site. Furthermore, the administrator may have the control to extend the routing and security policies down to the application and take advantage of the data plane capabilities to apply the service mesh services to the application.

Figure 7:
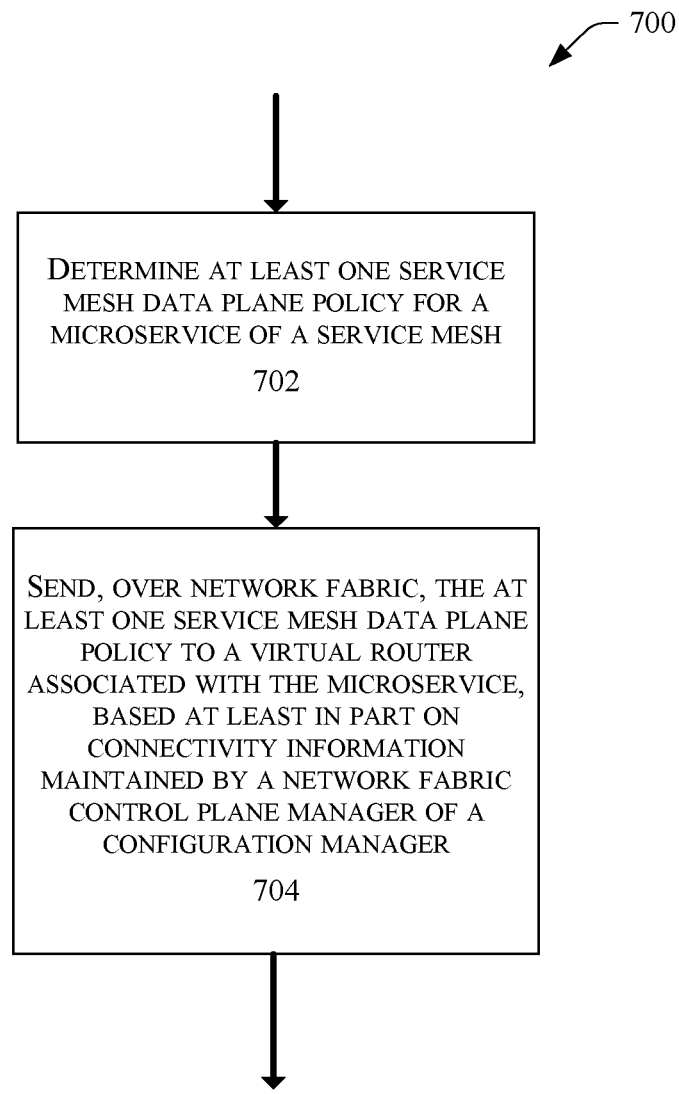
FIG. 7 is a flowchart illustrating a process by which a configuration manager may configure a service mesh data plane, such as from a central location, over a network fabric.

FIG. 7 is a flowchart illustrating a process by which a configuration manager may configure a service mesh data plane, such as from a central location, over a network fabric. At 702, at least one service mesh data plane policy is determined for a microservice of a service mesh. For example, the CSMM 114 may determine the at least one service mesh data plane policy based on input provided from the integrated management platform 118. At 704, the at least one service mesh data plane policy is sent, over a network fabric, to a virtual router associated with the microservice. The sending is based at least in part on connectivity information maintained by a network fabric control plane manager of a configuration manager. The configuration manager may be, for example, the network controller 102 and the OPMD 104 may be the network fabric control plane manager maintaining the connectivity information of the network fabric.

For example, the network controller 102 may send network fabric control plane information over the secure transport layer tunnel from the configuration manager to the virtual router and, in addition, the network controller 102 may send the at least one service mesh data plane policy over the same secure transport layer tunnel. Furthermore, the network controller 102 may determine both the network fabric control plane information and the at least one service mesh data plane policy based on input provided from the integrated management platform 118.

Figure 8:
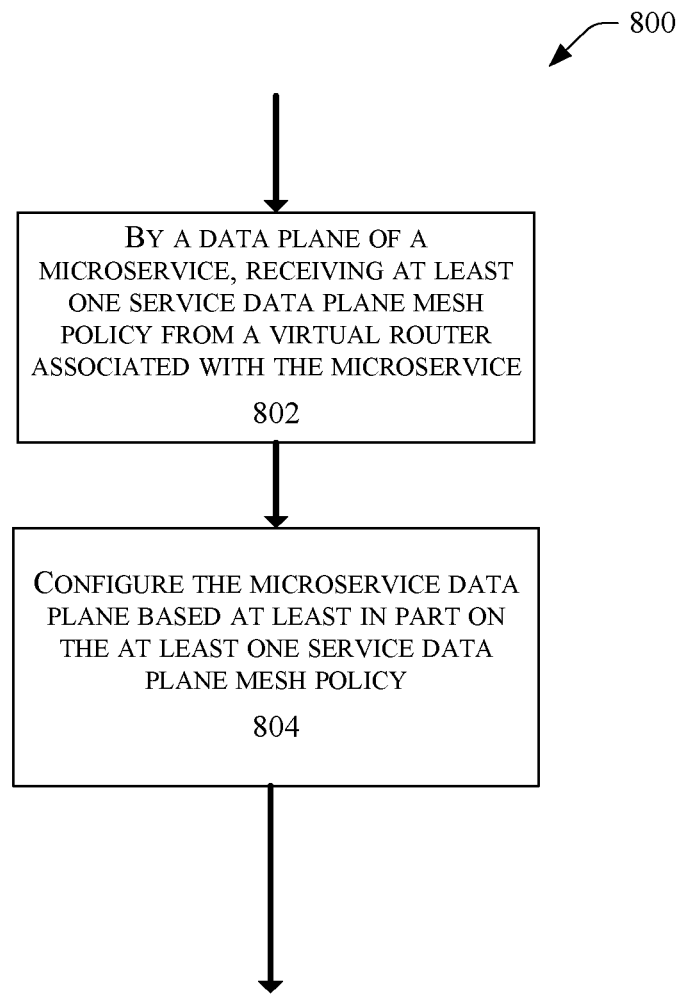
FIG. 8 is a flowchart illustrating a process by which a service mesh data plane may be configured based at least in part on a service mesh data plane policy provided over a network fabric.

FIG. 8 is a flowchart illustrating a process by which a service mesh data plane may configure itself based at least in part on a service mesh data plane policy. At 802, a data plane of a microservice receives at least one service mesh data plane policy from a virtual router associated with the microservice. For example, the data plane may be within the virtual router 106 and the virtual router may receive the at least one service mesh data plane policy via a secure transport layer connection between the virtual router 106 and the network controller 102. At 804, the microservice data plane is configured based at least in part on the at least one service mesh data plane policy. For example, the service mesh data plane 204 may communicate with the dataplane sidecar 210a, the dataplane sidecar 210b and/or the dataplane sidecar 210c, which configures a microservice dataplane of the respective application pod workload 212a, application pod workload 212b and/or the application pod workload 212c. Thus, for example, a system may provide for integrated central management of cloud-native microservices as well as management of an SD-WAN that provides, in part, for communication among the microservices.

Figure 9:
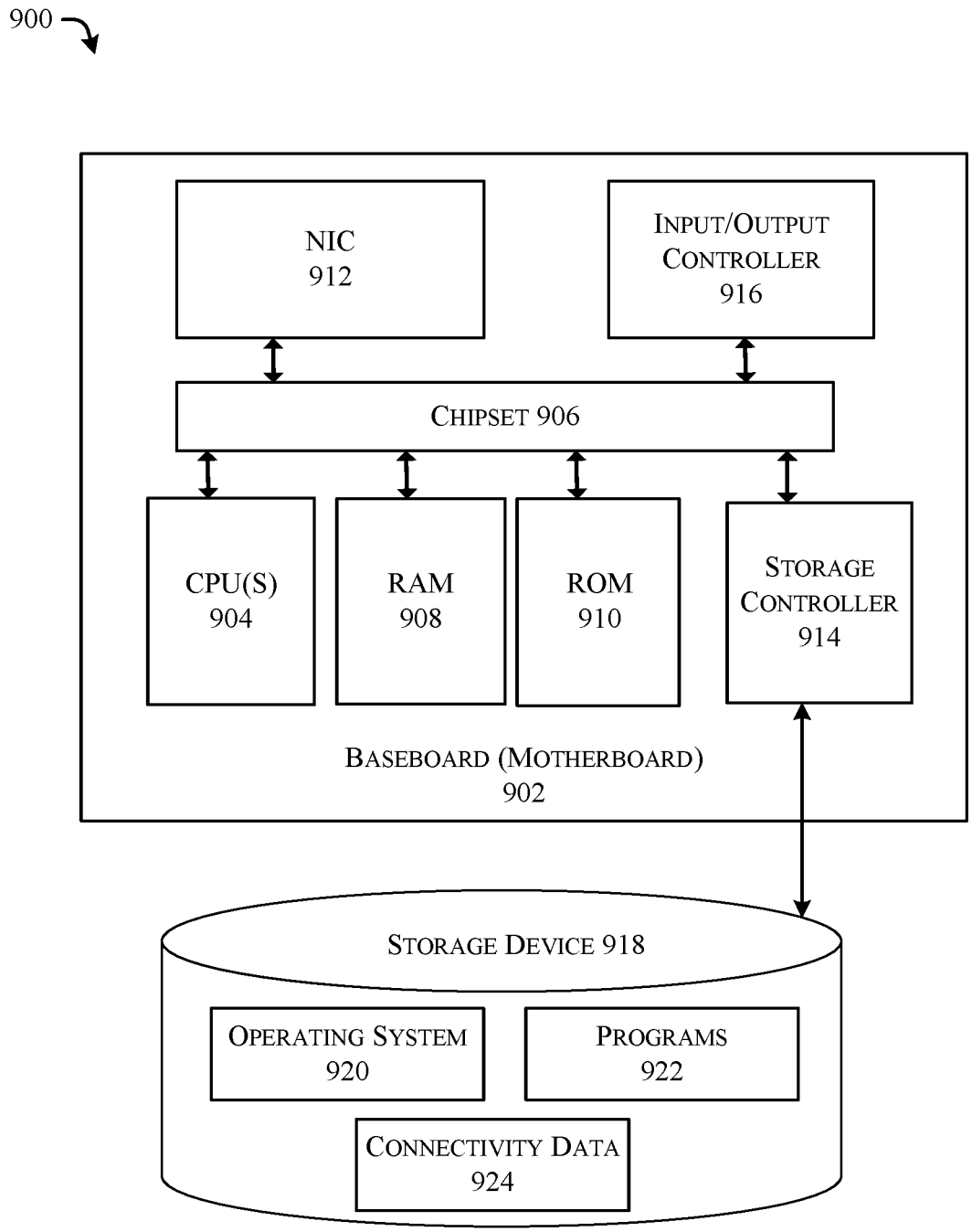
FIG. 9 illustrates an example computer architecture for a computer capable of executing program components for implementing the functionality described herein.

FIG. 9 illustrates an example computer architecture for a computer 900 capable of executing program components for implementing the functionality described above. The computer architecture shown in FIG. 9 illustrates an architecture of a server computer, workstation, desktop computer, laptop, tablet, network appliance, e-reader, smartphone, network switch, or other computing device, and can be utilized to execute any of the software components presented herein. The computer 900 may, in some examples, correspond to a network infrastructure device discussed herein.

The computer 900 includes a baseboard 902, or "motherboard," which may be a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be, for example, standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein. As illustrated in FIG. 9, the ROM 910 or NVRAM can also store data usable by the computer 900 to generate and/or process attestation information in messages exchanged among the computer 900 and other devices. In other examples, this data may be stored elsewhere, such as in RAM 908.

The computer 900 can operate in a networked environment using logical connections to remote computing devices and computer systems through a network. For example, the chipset 906 can include functionality for providing network connectivity through a Network Interface Controller (NIC) 912, such as a gigabit Ethernet adapter. The NIC 912 can connect the computer 900 to other computing devices over a network. It should be appreciated that multiple NICs 912 can be present in the computer 900, connecting the computer to other types of networks and remote computer systems. In some instances, the NICs 912 may include at least one ingress port and/or at least one egress port. An input/output controller 916 may be provided for other types of input/output.

The computer 900 can be connected to a storage device 918 that provides non-volatile storage for the computer. The storage device 918 can store an operating system 920, programs 922, and data 924, for example. The storage device 918 can be connected to the computer 900 through a storage controller 914 connected to the chipset 906. The storage device 918 can include one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The data 924 may include, for example, network fabric connectivity data.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like. For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the storage device 918 described above, the computer 900 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 900.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. An integrated management method to manage a data plane of a service mesh over a wide area network (WAN) fabric, the method comprising:
   receiving, at a controller that manages communications over the WAN fabric, one or more indications of a first microservice at a first site and a second microservice at a second site, the first and second microservices being included in a service mesh;
   receiving service mesh policies that includes instructions for managing data plane communications in the service mesh;
   receiving routing policies for managing data plane communications over the WAN fabric;
   using the service mesh policies and routing policies, determining a service mesh data plane policy for at least the first and second microservices in the service mesh, wherein the service mesh data plane policy includes instructions for managing data plane communications over the WAN fabric and between the first microservice and the second microservice; and
   using the service mesh data plane policy, managing data plane communications over the WAN network fabric and between the first microservice and the second microservice.

2. The method of claim 1, wherein
   the method further comprises sending the service mesh data plane policy to a first virtual router associated with the first microservice and a second virtual router associated with the second microservice based at least in part on connectivity information maintained by a network fabric control plane manager.

3. The method of claim 1, further comprising:
   sending the service mesh data plane policy to a service mesh data plane edge proxy of a virtual router associated with the first microservice.

4. The method of claim 1, further comprising:
   sending the service mesh data plane policy over a secure transport layer tunnel from a configuration manager to a virtual router associated with the first microservice.

5. The method of claim 4, further comprising:
   sending network fabric control plane information over the secure transport layer tunnel from a configuration manager to the virtual router.

6. The method of claim 1, further comprising:
   by a service mesh manager of a configuration manager, receiving an indication of a mesh connector policies configuration via an application programming interface exposed by a configuration manager; and
   wherein a service mesh manager determines the service mesh data plane policy based at least in part on the indication.

7. The method of claim 1, further comprising:
   by a network fabric control plane manager, receiving an indication of network fabric connectivity policy configuration via an application programming interface exposed by a configuration manager; and wherein a network fabric control plane manager determines connectivity information based at least in part on the indication of network fabric connectivity policy configuration.

8. The method of claim 1, further comprising:
by a data plane of the microservice, receiving the service mesh policies from a virtual router associated with the service mesh; and
configuring a microservice data plane based at least in part on the service mesh policies.

9. A method of configuring a microservice of a cloud-native application, comprising:
by a controller that manages communications over a wide area network (WAN) fabric for a data plane of the microservice, receiving one or more indications of a first microservice at a first site and a second microservice at a second site the first and second microservices being included in a service mesh;
receiving service mesh policies that includes instructions for managing data plane communications in the service mesh;
receiving routing policies for managing data plane communications over the WAN fabric;
using the service mesh policies and routing policies, determining a service mesh data plane policy associated with the microservice, wherein the service mesh data plane policy includes instructions for managing data plane communications over the WAN fabric and between the first microservice and the second microservice; and
using the service mesh data plane policy, configuring the data plane of the microservice based at least in part on the service mesh data plane policy such that the microservice data plane managed data plane communications between the first site and second site over the WAN fabric according to the service mesh data plane policy.

10. The method of claim 9, wherein:
determining the service mesh data plane policy includes receiving the service mesh data plane policy from a front service mesh data plane of a virtual router associated with the microservice.

11. The method of claim 9, wherein:
determining the service mesh data plane policy includes receiving the service mesh data plane policy over a transport layer connection between a virtual router associated with the microservice and a data plane proxy associated with the microservice.

12. The method of claim 9, wherein:
determining the service mesh data plane policy includes receiving, by a process of a data plane proxy associated with the microservice receiving the service mesh data plane policy over a transport layer connection with a virtual router associated with the microservice.

13. The method of claim 9, further comprising:
operating the data plane of the microservice based at least in part on the service mesh data plane policy.

14. A configuration manager, comprising:
one or more processors; and
one or more non-transitory computer-readable media storing computer-executable instructions that, when executed by the one or more processors, cause the one or more processors to perform operations of:

receiving, at a controller that manages communications over a wide area network (WAN) fabric, one or more indications of a first microservice at a first site and a second microservice at a second site, the first and second microservices being included in a service mesh;
receiving service mesh policies that includes instructions for managing data plane communications in the service mesh;
receiving legacy routing policies for managing data plane communications over the WAN fabric;
using the service mesh policies and legacy routing policies, determining a service mesh data plane policy for at least the first and second microservices in the service mesh, wherein the service mesh data plane policy includes instructions for managing data plane communications over the WAN fabric and between the first microservice and the second microservice; and
using the service mesh data plane policy, managing data plane communications over the WAN network fabric and between the first microservice and the second microservice.

15. The configuration manager of claim 14, wherein the operations further comprise sending the service mesh data plane policy to a first virtual router associated with the first microservice and a second virtual router associated with the second microservice based at least in part on connectivity information maintained by a network fabric control plane manager.

16. The configuration manager of claim 14, wherein:
sending the service mesh data plane policy to a service mesh data plane edge proxy of a virtual router associated with the first microservice.

17. The configuration manager of claim 14, wherein:
sending the service mesh data plane policy over a secure transport layer tunnel from a configuration manager to a virtual router associated with the first microservice.

18. The configuration manager of claim 17, the operations further comprising:
sending network fabric control plane information over the secure transport layer tunnel from a configuration manager to the virtual router.

19. The configuration manager of claim 14, the operations further comprising:
by a service mesh manager of the configuration manager, receiving an indication of a mesh connector policies configuration via an application programming interface exposed by a configuration manager; and
wherein a service mesh manager determines the service mesh data plane policy based at least in part on the indication.

20. The configuration manager of claim 14, the operations further comprising:
by a network fabric control plane manager, receiving an indication of network fabric connectivity policy configuration via an application programming interface exposed by a configuration manager; and
wherein a network fabric control plane manager determines connectivity information based at least in part on the indication of network fabric connectivity policy configuration.

* * * * *